Figure 1:
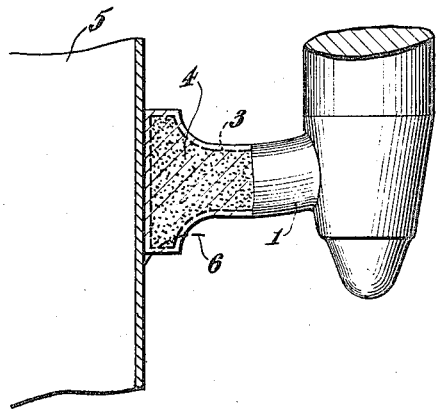

April 29, 1924.  1,491,879

C. PACK ET AL

DIE CASTING AND METHOD OF WELDING SAME TO A METALLIC SURFACE

Filed March 22, 1921

Inventors
Charles Pack
Stanley R. Kurch
By their Attorney

Patented Apr. 29, 1924.

1,491,879

UNITED STATES PATENT OFFICE.

CHARLES PACK, OF ELMHURST, AND STANLEY R. KUECH, OF BROOKLYN, NEW YORK, ASSIGNORS TO DOEHLER DIE CASTING COMPANY, OF BROOKLYN, NEW YORK, A CORPORATION OF NEW YORK.

DIE CASTING AND METHOD OF WELDING SAME TO A METALLIC SURFACE.

Application filed March 22, 1921. Serial No. 454,361.

*To all whom it may concern:*

Be it known that we, CHARLES PACK and STANLEY R. KUECH, both citizens of the United States, residing, respectively, at Elmhurst, in the county of Queens, city and State of New York, and in the borough of Brooklyn, county of Kings, city and State of New York, have invented certain new and useful Improvements in Die Castings and Methods of Welding Same to a Metallic Surface, of which the following is a specification.

The object of this invention is to provide a simple, inexpensive and effective method of and means for welding to metallic surfaces generally die-castings of the class commonly termed "white-metal" and composed chiefly of aluminum alloyed with various other metals such as zinc, tin, nickel, etc. The problem involved hinges chiefly upon the character of the material of which such castings are composed. In the production of die-castings, the molten metal is forced, either by gravity or air-pressure, into a steel die from which, after solidification and substantial loss of contained heat, it is removed. In this process of solidification, the action takes place first at the exterior of the casting, proceeding thence to the interior. There is thus set up a tendency of the metal to shrink and draw and this commonly results in the formation of air-holes. It has been found that such air-holes form mainly in the interior of the casting, the exterior being practically free therefrom, the solid portion extending an appreciable distance into the casting depending, among other things, upon its design and mass.

In the welding of such a casting to a metallic surface, as by the autogenous process, the heat promptly fuses and breaks through the solid outer portion of the casting, exposing the inner more-or-less cellular or spongy portion and, while the weld may be mechanically strong, it is necessarily unsightly, the exposed surface of the casting at the welded point being pitted and without finish.

Under the present invention, we take advantage of the fact above noted, that to an appreciable extent the exterior and immediately adjacent portions of a die-casting are substantially free from air-holes. We, therefore, preferably during the process of forming the casting, provide the same with what we term a "welding flange," this being a flange or rib, arranged at the point where the casting is to be welded to a metallic surface, of such thinness as to assure that during the process of solidification and cooling the solid areas will extend toward and join each other, such flange, therefore, being free from objectionable air-holes which would be exposed by the welding operation. By the application of the torch to such flange and either by partially (or wholly) fusing the same or by the addition of molten metal thereto during the welding operation, the casting may readily be welded to a metallic surface by a smooth and finished weld and without sacrifice of the required strength of the union.

Figure 2:
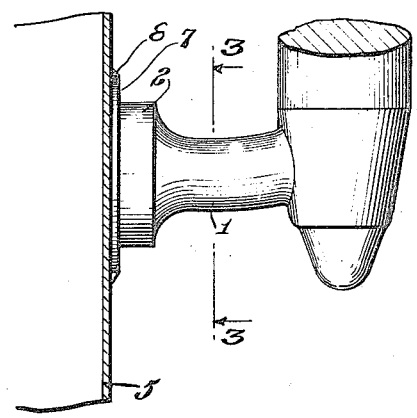
Figure 3:
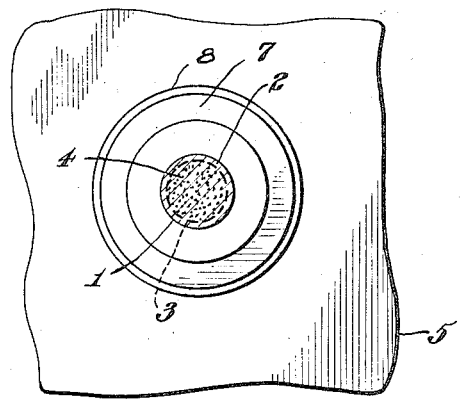

Referring to the accompanying drawing, we have illustrated for the purpose of this disclosure a white-metal die-casting forming part of the handle of a culinary utensil. In this drawing, Fig. 1 is an elevation, partly in section of such handle-part and a portion of the utensil, and Figs. 2 and 3 are respectively an elevation and a sectional view taken on the line 3—3 of Fig. 2, illustrating the practice of this invention.

The handle-part 1, by reason of its formation in a steel die as aforesaid, is characterized by a hard, smooth and substantially solid exterior portion 2 extending an appreciable distance into the casting, as illustrated by the dotted line 3. The interior of the casting 4 is characterized by air-holes, roughly indicated by the stippling in Fig. 1. In welding the handle-part shown in Fig. 1 to a metallic member such as 5, the tendency would be to fuse and break down the portion of the part indicated by the dotted line 6. This, as clearly indicated, would expose the cellular portion 4, leaving therefore an unsightly weld. This would be apt to occur even if the effort were to effect the weld by means of added metal owing to the heat of the torch adjacent to the point of union.

Under our invention we provide what we term a "welding flange" 7 adjacent to the point of union, making this, preferably, integral with the casting, of the maximum thickness that can be relied upon to solidify during the cooling of such casting. A thickness of approximately one-sixteenth of an inch will be found practicable with the majority of small castings.

It will be apparent that, the metal of such welding flange being solid and substantially free from air-holes, it may readily be joined to the metallic part 5 by autogenous welding as at 8, involving either the addition of metal or the fusing of the metal of such flange (or both) without leaving a rough or pitted surface but, on the contrary, the welding line being smooth and practically finished upon the removal of the torch.

What we claim is:—

The method of uniting a white metal die-casting with a metallic surface, such casting having a smooth, substantially solid exterior and an interior characterized by air-holes throughout the mass, which method consists in forming on and integral with said casting, adjacent to the point of attachment, a part of substantially solid white metal and welding such part to said metallic surface, substantially as set forth.

This specification signed and witnessed this 18th day of March, 1921.

CHAS. PACK.
STANLEY R. KUECH.

Witnesses:
WILLIAM R. AHRBERG,
WILLIAM E. BAUERSCHMIDT.